Patented Aug. 8, 1939

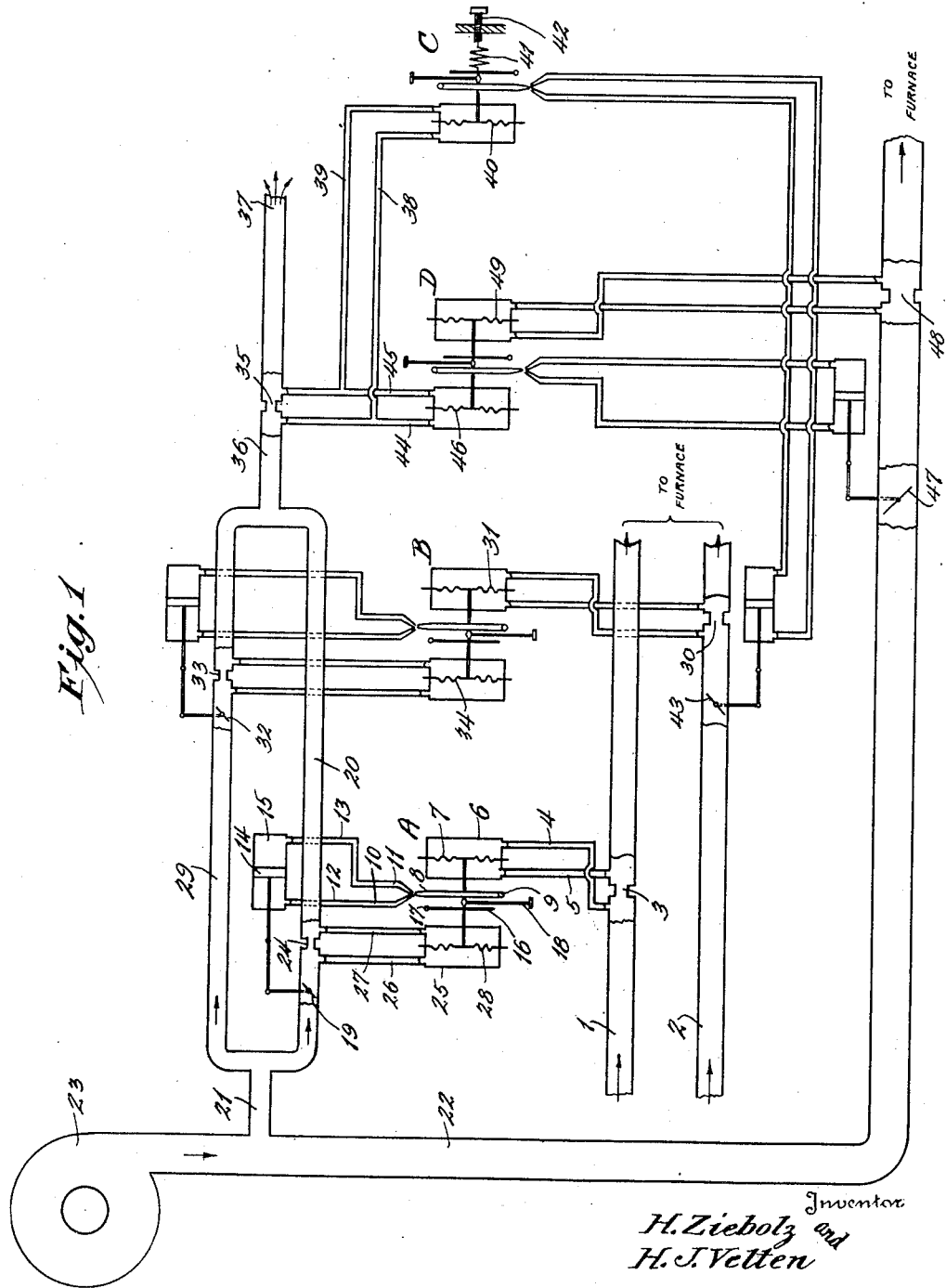

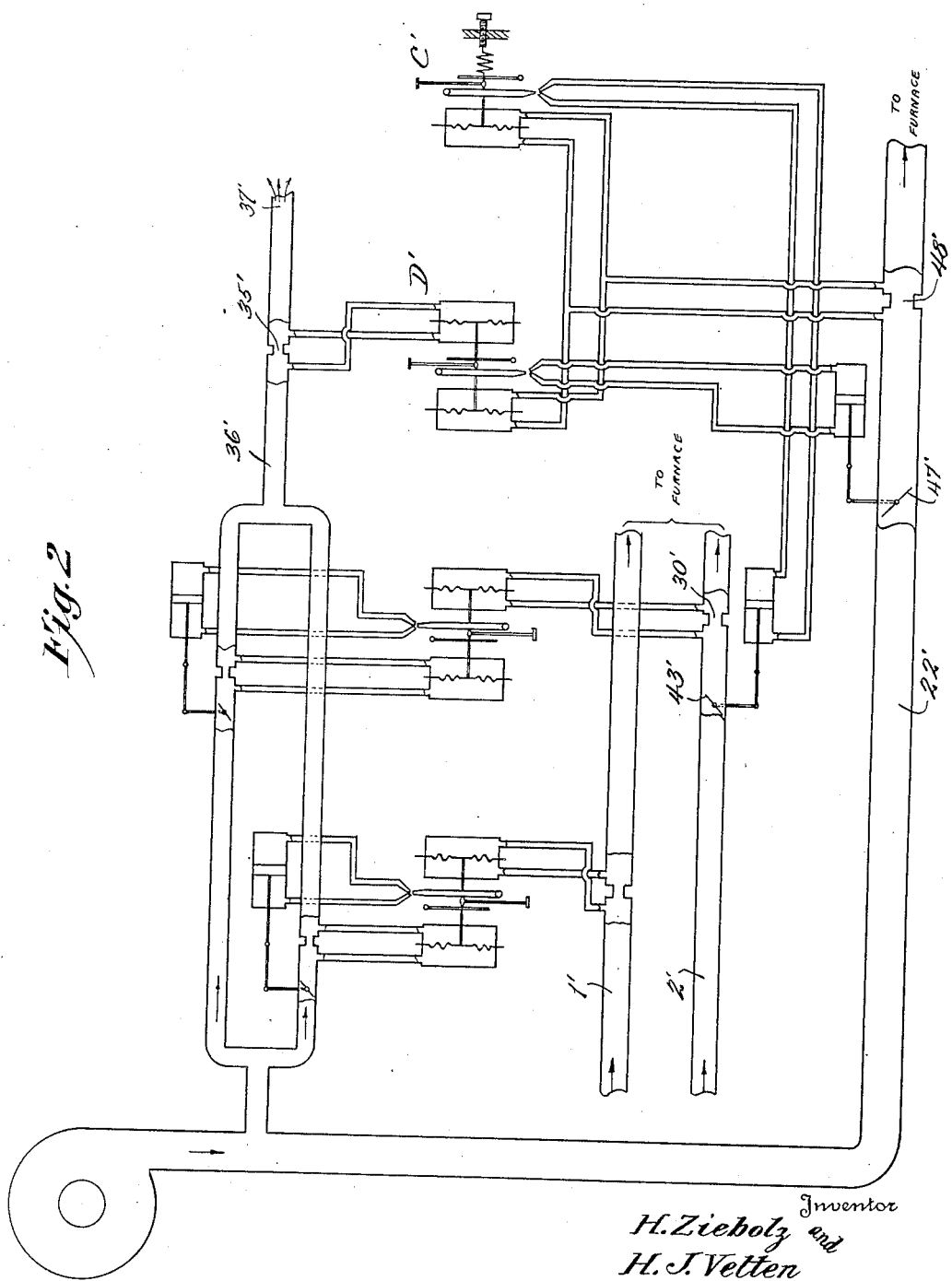

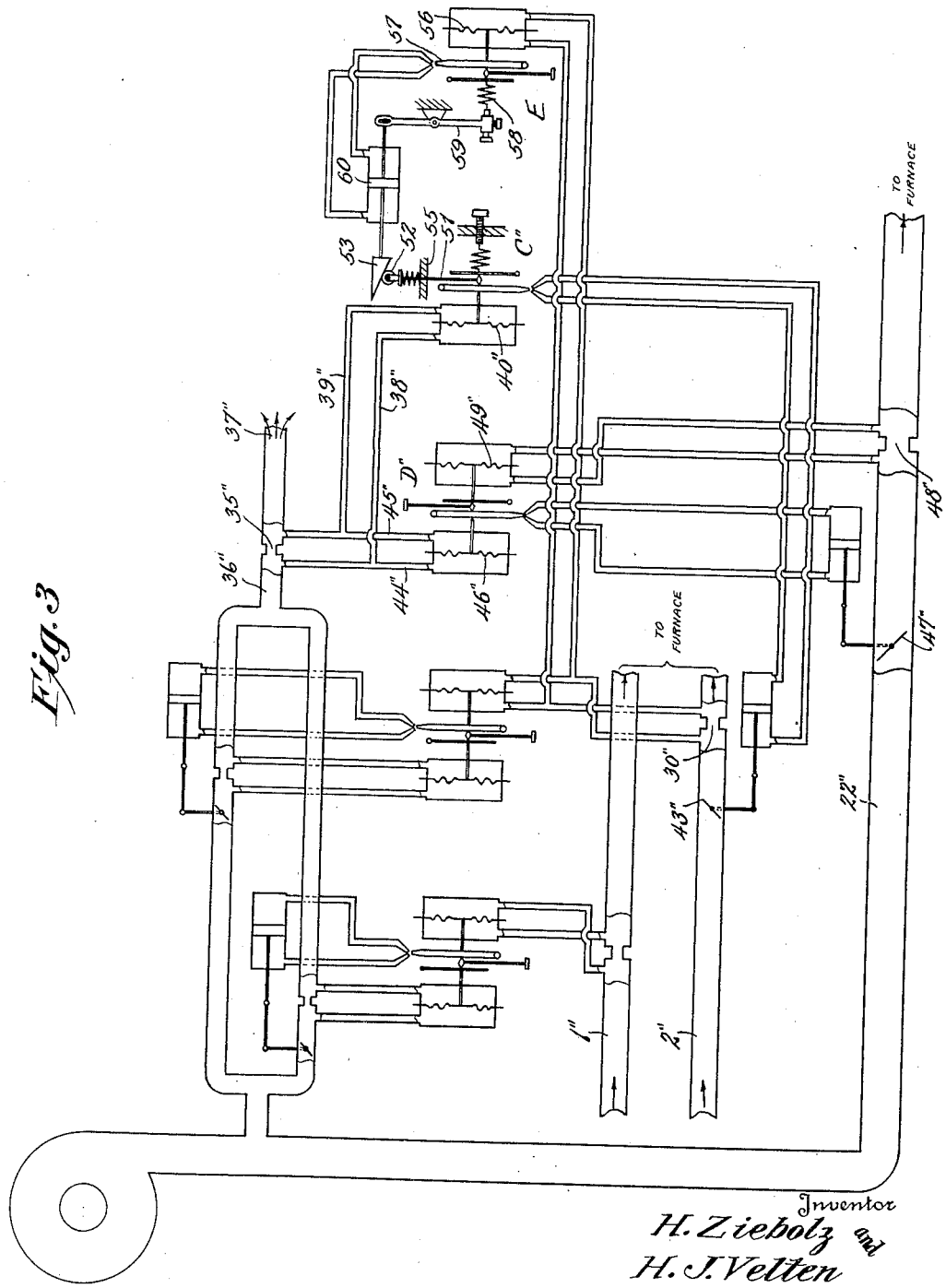

2,169,174

UNITED STATES PATENT OFFICE 2,169,174

METHOD OF AND APPARATUS FOR CONTROLLING THE FLOW OF FLUIDS

Herbert Ziebolz and Hubert J. Velten, Chicago, Ill., assignors to Askania-Werke A. G., a company of Germany Application October 7, 1936, Serial No. 104,527

16 Claims. (Cl. 158—119)

This invention relates to an improved method of and apparatus for maintaining the sum of the flows of a plurality of different pressure fluids which are subject to a variable flow, substantially constant. More particularly the invention relates to a method of and apparatus for maintaining the amount of heat created in a furnace supplied with separate combustible fluids constant. This application involves specific improvements in the method and apparatus disclosed in the copending applications Serial No. 104,526 and Serial No. 104,528, filed on even date herewith.

The invention aims to provide a simple, reliable and accurate method and apparatus especially for use in gas plants, industrial heating plants and the like, where the atmospheric air contains dust and other impurities which impair the operation of ordinary regulating mechanisms. Other aims and advantages of this invention will appear in the following description, considered in connection with the accompanying drawings wherein:

Figure 1 is a diagrammatic illustration of one form of apparatus for practicing the invention; and Figure 2 shows a modified form of control mechanism which may be employed.

Figure 3 shows a modified form of control mechanism for controlling the heat supply to a furnace with great accuracy.

Referring to the novel method of maintaining the sum of the flows of a plurality of combustible gases or other pressure fluids substantially constant, it is proposed, according to the invention, to create a plurality of pilot pressure fluid flows, proportional to the flows of the respective pressure fluids and to maintain the sum of the pilot flows substantially constant by varying the flow of at least one of the pressure fluids. More particularly the amount of heat delivered to a furnace supplied with different kinds of fuel may be maintained constant by applying the novel method according to this invention.

Use is hereby made of the well known rule that for all commercial gaseous fuels approximately the same amount of combustion air is required for producing the same amount of British thermal units (B. t. u.), irrespective of the B. t. u. content of the fuel per quantity unit. According to the novel method, therefore, the supply of heat may be maintained practically constant by creating a plurality of pilot pressure fluid flows which are each proportional to the amount of one of the fuels times its B. t. u. content, maintaining the sum of the pilot flows constant by varying the supply of at least one fuel, and maintaining the combustion air proportional to the sum of the pilot flows.

If liquid and gaseous fuels are simultaneously burned in a furnace the same rule and method which was above applied to gases is applicable and gives in most cases satisfactory results. As, however, liquid fuels do not exactly follow the above rule, a correction may be introduced, as hereinafter explained in detail, by varying the sum of the pilot flows in response to the supply of at least one of the fuels.

If solid fuels are burned together with gaseous and liquid fuels the correction may be advisable in each case if a great accuracy of the control is required.

The method may be practised in various ways. The pilot flow through the several branches may be derived from a common source, and the pilot pressure fluid may be the same as one of the pressure fluids to be regulated and varied where the character of the pressure fluid admits of such use. The method applied to a heat delivery or furnace control, for example, permits the use of air as the pilot fluid which may be derived from the source of combustion air. In practising the method, the flow of the pilot fluid through the separate branches is controlled in response to variations in the flow of the respective pressure fluids, the sum of the flows of which is to be maintained constant, or, more particularly, to the supply of different kinds of fuel, such as coke oven or producer gas and natural gas, delivered to the furnace. This is preferably accomplished by means of flow or quantity responsive devices, well known in the art, and arranged to operate valves in the pilot branches by means of regulators, preferably of the well-known "Askania" jet-pipe type. The sum of the pilot flows is used to control the supply of one or several fluids or fuels to be regulated by means of similar flow or quantity responsive devices, regulators and valves.

The illustrated example of apparatus for practicing the method is more particularly designed for maintaining the amount of heat created in a furnace constant. Gases or other combustible pressure fluids are delivered to a combustion or mixing chamber (not shown) through conduits 1 and 2, flowing through the same in the direction indicated by the arrows. The conduit 1 is equipped with a device responsive to the quantity of fluid passing through the same, shown as being a constriction 3, at which the flowing fluid will set up a differential pressure. The differential pressure across the constriction is transmitted through a pair of pipes 4 and 5 to a diaphragm casing 6 to act on opposite sides of a diaphragm 7 enclosed therein. The diaphragm, in turn, controls a regulator A, shown as being of the well-known "Askania" jet-pipe type, as shown and described in the patent to Wunsch No. 1,558,529, dated October 27, 1925.

As the same type of regulator is repeatedly used in this apparatus, it will be sufficient to describe the details of the regulator A. It is shown as comprising a jet-pipe 8 pivotally supported at 9 and supplied with pressure fluid from a source (not shown). The pressure fluid issues from the jet-pipe and enters the orifices 10 and 11 depending upon the relative position of the jet-pipe and the orifices. The pressure set up in the orifices 10 and 11 is transmitted through pipes 12 and 13 to act on a piston 14 in a cylinder 15. There is further provided a lever 16 pivotally mounted at 17 and cooperating with a ratio slider 18, the purpose of which will be hereinafter explained.

The regulator A is controlled by the diaphragm 7 and operates a valve 19 in a pilot conduit or branch 20. The pilot conduit 20 is shown as supplied with pressure fluid, such as air through a pipe 21 tapping a main pressure fluid conduit 22 which, in turn, is supplied by a pump or fan 23. It is understood, however, that a separate source of pressure fluid may be provided to feed the pilot conduit. A device responsive to the quantity of pressure fluid passing through the pilot pipe is provided and is shown as being a constriction 24. The differential pressure across the constriction is transmitted to a diaphragm casing 25 through pipes 26 and 27 to act on opposite sides of a diaphragm 28 connected to oppose the action of the diaphragm 7 on the jet-pipe 8. Upon a change of flow in the conduit 1, the differential pressure across the constriction 3 will increase and cause the jet-pipe to move to the left. The piston 14 will move to the right and thereby open the valve 19 to increase the flow through the pilot conduit 20. The increasing flow in the pilot conduit will set up an increasing differential pressure across the constriction 24 and the diaphragm 28 tends to restore the jet-pipe to its neutral position. The ratio slider permits to establish a certain relation between the main flow through the conduit 1 and the pilot flow through the conduit 20 which is then used to regulate the combustion air supply. As a gas of a B. t. u. content of 1000 per cubic foot requires approximately twice as much combustion air as a gas of a B. t. u. content of only 500, the respective regulator will have to be set to permit twice as much pilot fluid to flow through the respective conduit per cubic foot of gas than the regulator for the gas containing only 500 B. t. u.

A second pilot fluid flow, proportional to the flow in the second main conduit 2, is branched to flow through a second pilot conduit 29 and is controlled by means of a similar arrangement, comprising a constriction 30 in the conduit 2 and a regulator B controlled by a diaphragm 31. The regulator B operates a valve 32 in the pilot conduit 29, thereby controlling the flow through the same. The regulator B is restored by the differential pressure across a constriction 33 acting on a diaphragm 34.

The sum of the pilot flows acts on a device responsive to the quantity of flow, and is also shown as being a constriction 35 in a common conduit 36 through which the pilot fluid from the branches 20 and 29 is discharged at 37. It is understood, however, that the device responsive to the total amount of pressure fluid may also be arranged in the conduit 21 instead of in the conduit 36. The differential pressure across the constriction 35 acts through pipes 38 and 39 on opposite sides of a diaphragm 40 controlling a regulator C. The regulator is restored to its neutral position by means of a spring 41 which is adjustable by means of a screw 42. This regulator is connected to operate a valve 43 in the conduit 2 to control the flow therein.

A second regulator D is connected to be operated in response to the total pilot flow by means of pipes 44 and 45 transmitting differential pressure to act on opposite sides of a diaphragm 46. The regulator D operates a valve 47 in the conduit 22 thereby regulating the combustion air according to variations of the total pilot flow. The restoring device for the regulator D comprises a constriction 48 in conduit 22 and a diaphragm 49.

The operation of the apparatus may conveniently be explained by way of the following example:

It may be assumed that two gases, natural gas of a B. t. u. value of 1000 and coke oven gas of 500 B. t. u., are used to supply a furnace with a constant amount of heat. The gases are supplied to the furnace through the conduits 1 and 2, respectively. It may be further assumed that the natural gas, carried by the conduit 1, is subject to substantial variations in the rate of flow.

The regulator A, controlling the pilot flow for the natural gas, is adjusted by means of its ratio slider so that it permits two units of pilot flow to pass through the conduit 20 for each cubic foot of gas. The regulator B is so adjusted that it permits only one unit of pilot flow to pass through the conduit 29 in accordance with the fact that the coke oven gas requires only half as much combustion air per cubic foot than the natural gas on account of its lower B. t. u. content.

Upon an increase of flow, of the natural gas in conduit 1, the regulator A will automatically increase the pilot flow through the respective pilot conduit 20, thereby increasing the sum of the pilot flows acting on the constriction 35 and controlling the regulators C and D. The increase in differential pressure across the constriction 35 will cause the jet pipe of the regulator C to move to the right against the action of the spring 41 and thereby cause the valve 43 to throttle the supply of coke oven gas. The reduced flow through the conduit 2 will result in a decrease of flow through the respective pilot conduit 29 until the total pilot flow, and, correspondingly, the differential pressure across the constriction 35 has so far decreased that the jet pipe of the regulator C returns to its neutral position. It is easily seen that the amount of heat supplied to the furnace may be initially set by adjusting the spring 41 of the regulator C controlling the total pilot flow. The regulator D will, at all times, vary the flow of air through the conduit 22 in response to the total pilot flow, or, in other words, in response to the total amount of heat supplied to the furnace. The regulator D will automatically vary the amount of combustion air upon setting of the regulator C for a different amount of heat.

A modified form of apparatus is diagrammatically shown in Figure 2. The regulator C' is controlled by the differential pressure across the constriction 48' in the conduit 22'. The regulator D' is controlled by the same differential pressure and restored to its neutral position by a differential pressure across the constriction 35' exposed to the total pilot flow in conduit 36'. Upon an increase of the total pilot flow, corresponding to an increase of flow through the conduits 1' or 2', or both, the regulator C' will automatically decrease the flow through the conduit 2' by moving the valve 43' towards the closed position until a new gas flow of the previous B. t. u. value, or in other words, the previous total pilot flow, is restored. The regulator D' will at all times maintain the flow of combustion air proportional to the pilot flow.

A modified form of control mechanism is shown in Figure 3. This form is especially adapted for controlling with great accuracy the heat supply to a furnace in which gaseous fuels are burned together with liquid or solid fuels.

The control mechanism shown in Figure 3 is substantially based on the form of control mechanism shown in Figure 1. The regulator C" is provided with an automatic device for varying the position of the ratio slider 51. The ratio slider is shown as provided with a roller 52 bearing against a cam 53 in opposition to the action of a spring 54 which bears with one end against a fixed stop 55. A regulator E is connected to be operated in response to the variations of flow of fluid through one of the main conduits by virtue of its controlling diaphragm 56 being connected to a flow responsive device, shown as the constriction 30" in the conduit 2". The jet-pipe 57 of the regulator E is shown as being restored by a spring and lever mechanism 58, 59 connected to the servo motor 60 which controls the position of the cam 53. The operation of the device is as follows. It may be assumed that the conduit 1" carries 50 cubic feet of natural gas per minute while one gallon of fuel oil per minute is being supplied through the conduit 2". The flow of natural gas may happen to increase to 60 cubic feet per minute and the regulator operate in a manner hereinbefore explained to decrease the flow of fuel oil to maintain the heat supply constant. It may be further assumed that by merely maintaining the sum of the pilot flows, and correspondingly the flow of the combustion air, constant, the amount of heat will fall below the predetermined value. The regulator E will now introduce a correction as follows. According to the diminished flow of oil through the conduit 2" the differential pressure acting on the diaphragm 56 will cause the jet-pipe 57 to move to the right under action of the spring 58. The piston of the servo motor will therefore move to the left, thereby moving the ratio lever 51 inwardly. The force acting on the restoring spring of the regulator C" will now exceed the force of the diaphragm 40" and the jet-pipe of the regulator C" move to the left, thereby causing the valve 43" to open further to increase the oil supply by a certain amount, thereby increasing the heat in the furnace. The supply of combustion air is automatically increased in a manner hereinbefore described.

The cross section of the pilot conduits and of the constrictions therein can easily be made large enough and the flow of the pilot fluid in all conduits accordingly increased to prevent impurities of the air, or other pilot fluid, from impairing the proper working of the apparatus by clogging the constrictions.

The present invention is not restricted to the particular apparatus shown and described for practicing the method. Moreover, it is not indispensable that all the features of the apparatus be used conjointly, since they may be employed advantageously in various combinations and subcombinations. Furthermore, the method is capable of many variations without departing from the spirit of the invention as set forth in the appended claims.

What is claimed is:

1. Apparatus for maintaining the sum of the flows of a plurality of pressure fluids substantially constant, comprising, in combination, a conduit for each of said pressure fluids; means responsive to the flow through each of said conduits; a pilot conduit for each of said pressure fluids; a source of pilot fluid; means controlled by said flow responsive means for varying the delivery of pilot fluid through said pilot conduits proportional to the flows of the respective first named pressure fluids; means responsive to the deviation of the sum of the pilot flows from a predetermined value; and means controlled by said deviation responsive means for varying the flow of at least one of the pressure fluids.

2. Apparatus for maintaining the amount of heat created in a furnace substantially constant, comprising, in combination, means for conveying a plurality of different fuels to the furnace; means responsive to the rate of supply of each of said fuels; a source of combustion air; a conduit for said air; a plurality of pilot conduits, one for each fuel; means controlled by said rate of supply responsive means for delivering pilot fluid through said pilot conduits proportional to the product of the quantity of the respective fuels conveyed to said furnace times the respective B. t. u. value; means responsive to the sum of the flows through the pilot conduits; a flow controlling valve in said air conduit; operating means for said valve connected to be controlled by said flow responsive means; and means for varying the quantity of fuel conveyed to the furnace upon deviation of the flow of combustion air from a predetermined value.

3. Apparatus for maintaining the amount of heat created in a furnace substantially constant, comprising, in combination, a plurality of sources of combustible pressure fluids including conduits for the respective pressure fluids; a source of combustion air; a conduit for said air; a plurality of pilot conduits, one for each pressure fluid; means for delivering pressure fluid to said pilot conduits; a valve in each of said pilot conduits; jet-pipe regulators, each having a ratio varying device, connected to operate said valves; means responsive to the quantity of fluid flowing through said pressure fluid conduits and connected to control said jet-pipe regulators; means responsive to the quantity of fluid flowing through said pilot conduits and connected to restore the respective regulators to their neutral positions; valve means for varying the total flow of fluid through said combustible pressure fluid conduits; a jet-pipe regulator connected to control said valve means; means responsive to the quantity of the sum of the fluids flowing through all of the pilot conduits and connected to control said regulator for the valve means; an adjustable spring connected to restore said regulator for the valve means to a neutral position; a valve in the conduit carrying the combustion air; a jet-pipe regulator connected to actuate the last named valve; said last named jet-pipe regulator being connected to be controlled by said means responsive to the sum of the fluids flowing through all of the pilot conduits; and means responsive to the quantity of air flowing through said combustion air conduit and connected to restore said last named regulator to a neutral position.

4. Apparatus for maintaining the amount of heat created in a furnace substantially constant, comprising, in combination, a plurality of sources of different combustible pressure fluids including conduits for the respective fluids; a source of combustion air; a conduit for said air; a plurality of pilot conduits, one for each pressure fluid; means for delivering pressure fluid to said pilot conduits; a valve in each of said pilot conduits; jet-pipe regulators connected to operate said valves; means responsive to the quantity of fluid flowing through said pressure fluid conduits and connected to control said jet-pipe regulators; means responsive to the quantity of fluid flowing through said pilot conduits and connected to restore the respective regulators to their neutral positions; valve means in said pressure fluid conduits for varying the flow of fluid through the same; a jet-pipe regulator connected to control said valve means; means responsive to the quantity of air flowing through the combustion air conduit and connected to control said regulator for the valve means; an adjustable spring connected to restore said regulator for the valve means to a neutral position; a valve in said combustion air conduit; a jet-pipe regulator connected to actuate said last named valve and connected to be controlled by said means responsive to the quantity of air flowing through the combustion air conduit; and means responsive to the sum of the flows through all of the pilot conduits and connected to restore said last named regulator to a neutral position.

5. Apparatus for maintaining the amount of heat created in a furnace constant, comprising, in combination, means for conveying a plurality of different fuels to the furnace; means responsive to the rate of supply of each of said fuels; a source of combustion air; a conduit for said air; a plurality of pilot conduits, one for each fuel; means including a source and controlled by said supply responsive means for supplying each pilot conduit with pressure fluid proportional to the product of the quantity of the respective fuel conveyed to said furnace times its B. t. u. value; means responsive to the deviation of the sum of the flows through the pilot conduits from a predetermined value for varying the supply of at least one fuel to the furnace; means for correcting the magnitude of said predetermined value in response to the change of supply of at least one of the fuels; and means for varying the flow of combustion air in proportion to the sum of the flows through said pilot conduits.

6. Apparatus for maintaining the amount of heat created in a furnace constant, comprising, in combination, a plurality of sources of combustible pressure fluids including conduits for the respective pressure fluids; a source of combustion air; a conduit for said air; a plurality of pilot conduits, one for each pressure fluid; means for delivering pressure fluid to said pilot conduits; a valve in each of said pilot conduits; jet-pipe regulators, each having a ratio varying device, connected to operate said valves; means responsive to the quantity of fluid flowing through said pressure fluid conduits and connected to control said jet-pipe regulators; means responsive to the quantity of fluid flowing through said pilot conduits and connected to restore the respective regulators to their neutral positions; valve means for varying the total flow of fluid through said combustible pressure fluid conduits; a jet-pipe regulator having a ratio varying device connected to control said valve means; means responsive to the quantity of the sum of the fluids flowing through all of the pilot conduits and connected to control said regulator for the valve means; an adjustable spring connected to restore said regulator for the valve means to a neutral position; means including a further jet-pipe regulator for adjusting the ratio varying device of said valve-means regulator in response to variations in supply of at least one of the fuels; a valve in the conduit carrying the combustion air; a jet-pipe regulator connected to actuate the last named valve; said last named jet-pipe regulator being connected to be controlled by said means responsive to the sum of the fluids flowing through all of the pilot conduits; and means responsive to the quantity of air flowing through said combustion air conduit and connected to restore said last named regulator to a neutral position.

7. That method of maintaining the sum of the flows of a plurality of pressure fluids, which are subject to changes in flow, constant, which consists in deriving from each of said flows a control value varying in response to the changes in the flow of the respective pressure fluid; creating a plurality of pilot pressure fluid flows; controlling said pilot flows in response to the respective pressure fluid; and maintaining the sum of the pilot flows constant by varying the flow of at least one of the pressure fluids.

8. That method of maintaining the amount of heat created in a furnace substantially constant which consists in supplying combustion air and a plurality of fuels to the furnace; deriving from the supply of each of said fuels a control value varying in response to the changes in the flow of the respective fuel; utilizing said control values for creating a plurality of pilot pressure fluid flows which are each proportional to the rate of supply of one of the fuels times its B. t. u. value; maintaining the sum of the pilot flows constant by varying the supply of at least one fuel; and maintaining the flow of combustion air proportional to the sum of the pilot flows.

9. That method of maintaining the amount of heat created in a furnace substantially constant which consists in delivering combustion air to the furnace and maintaining the supply of air constant; delivering a plurality of fuels to the furnace; deriving from the supply of each of said fuels a control value varying in response to the changes in the flow of the respective fuel; utilizing said control values for creating in response to said control values high load pressure fluid flows which are each proportional to the rate of supply of one of the fuels times its B. t. u. value; and maintaining the sum of the pilot flows proportional to the flow of the combustion air by varying the supply of at least one of the fuels.

10. That method of maintaining the sum of the flows of a plurality of pressure fluids constant which consists in deriving from the flow of each of said fluids a control value varying in response to the changes in the flow of the respective pressure fluid; supplying a pilot pressure fluid flow; dividing said pilot flow into branch flows one for each of said first named pressure fluids; proportioning each of said branch flows to the control values of the respective first named pressure fluids; and maintaining the sum of the branch flows constant by varying the flow of at least one of the first named pressure fluids.

11. That method of maintaining the amount of heat created in a furnace substantially constant which consists in supplying combustion air and a plurality of fuels to the furnace; deriving from the supply of each of said fuels a control value varying in response to the changes in the flow of the respective fuel; creating a pilot pressure fluid flow; dividing said pilot flow into branch flows, one for each fuel; utilizing said control values for automatically proportioning the branch flows to the product of the rate of supply of the respective fuels times their B. t. u. value; maintaining the sum of the branch flows constant by varying the supply of at least one of the fuels; and maintaining the flow of combustion air proportional to the sum of the branch flows.

12. That method of maintaining the amount of heat created in a furnace substantially constant which consists in delivering combustion air to the furnace and maintaining the supply of air constant; delivering a plurality of fuels to the furnace; deriving from the supply of each of said fuels a control value varying in response to the changes in the flow of the respective fuel; creating a pilot pressure fluid flow; dividing said pilot flow into branch flows; utilizing said control values for automatically proportioning the branch flows to the product of the flows of the respective fuels times their B. t. u. value; and maintaining the sum of the branch flows proportional to the flow of the combustion air by varying the supply of at least one of the fuels.

13. That method of maintaining the amount of heat created in a furnace constant which consists in supplying combustion air and a plurality of fuels to the furnace; deriving from the supply of each of said fuels a control value varying in response to the changes in the flow of the respective fuel; creating in response to said control values a plurality of pilot pressure fluid flows which are each proportional to the rate of supply of one of the fuels times its B. t. u. value; maintaining the sum of the pilot flows constant by varying the supply of at least one of the fuels; adjusting the magnitude of the sum of the pilot flows in response to the change of supply of at least one of the fuels; and maintaining the flow of combustion air proportional to the sum of the pilot flows.

14. That method of maintaining the amount of heat created in a furnace constant which consists in supplying combustion air and a plurality of fuels to the furnace; deriving from the supply of each of said fuels a control value varying in response to the changes in the flow of the respective fuel; creating a pilot pressure fluid flow; dividing said pilot flow into branch flows; utilizing said control values for automatically proportioning the branch flows in response to the change of supply of the respective fuels times their B. t. u. value; maintaining the sum of the branch flows constant by varying the supply of at least one of the fuels; adjusting the magnitude of the sum of the branch flows in response to the change of supply of at least one of the fuels; and maintaining the flow of combustion air proportional to the sum of the branch flows.

15. That method of maintaining the amount of heat created in a furnace constant which consists in delivering combustion air to the furnace and maintaining the supply of air substantially constant; delivering a plurality of fuels to the furnace; deriving from the supply of each of said fuels a control value varying in response to the changes in the flow of the respective fuel; creating a pilot pressure fluid flow; dividing said pilot flow into branch flows; utilizing said control values for automatically proportioning the branch flows to the product of the rate of supply of the respective fuels times their B. t. u. value; maintaining the sum of the branch flows proportional to the flow of the combustion air by varying the supply of at least one of the fuels; and correcting the flow of combustion air in response to the change of supply of at least one of the fuels.

16. Apparatus for maintaining the amount of heat created in a furnace substantially constant, comprising, in combination, means for conveying a plurality of different fuels to the furnace; means responsive to the rate of supply of each of said fuels; a source of combustion air; a conduit for said air; a plurality of pilot conduits, one for each fuel; a source for supplying each pilot conduit with pressure fluid; means controlled by said rate of fuel supply responsive means for varying the delivery of pilot fluid proportional to the product of the quantity of the respective fuel conveyed to said furnace times its B. t. u. value; means responsive to the deviation of the sum of the flows through the pilot conduits from a predetermined value for varying the supply of at least one fuel to the furnace; and means for varying the flow of combustion air in proportion to the sum of the flows through said pilot conduits.

HERBERT ZIEBOLZ.
HUBERT J. VELTEN.